United States Patent
Uchiyama et al.

[11] Patent Number: 6,055,044
[45] Date of Patent: Apr. 25, 2000

[54] APPARATUS FOR MEASURING CHARACTERISTICS OF OPTICAL FIBER

[75] Inventors: Haruyoshi Uchiyama; Zhixien Lee, both of Tokyo, Japan

[73] Assignee: Ando Electric Co., Ltd., Tokyo, Japan

[21] Appl. No.: 09/106,298

[22] Filed: Jun. 29, 1998

[30] Foreign Application Priority Data

Jun. 30, 1997 [JP] Japan .................................. 9-174767

[51] Int. Cl.[7] .................................................. G01N 21/00
[52] U.S. Cl. ........................................................ 356/73.1
[58] Field of Search ................................ 356/73.1, 350; 372/32; 369/116, 124; 359/152, 110, 153, 161, 173, 191

[56] References Cited

U.S. PATENT DOCUMENTS

| | | |
|---|---|---|
| 4,912,527 | 3/1990 | Yamazaki . |
| 5,010,587 | 4/1991 | Eklund ..................................... 455/618 |
| 5,367,397 | 11/1994 | Tajima . |
| 5,412,471 | 5/1995 | Tada et al. . |
| 5,657,307 | 8/1997 | Taneya et al. . |
| 5,767,956 | 6/1998 | Yoshida . |

FOREIGN PATENT DOCUMENTS 6-249747  9/1994  Japan .
7-260624  10/1995  Japan .

*Primary Examiner*—Frank G. Font
*Assistant Examiner*—Tu T. Nguyen
*Attorney, Agent, or Firm*—Fish & Richardson P.C.

[57] ABSTRACT

There is provided an apparatus for measuring the characteristics of an optical fiber in which a frequency difference between first and second coherent light respectively generated by first and second light sources can be accurately set and wherein preferable coherent detection can be carried out in accordance with frequency components of returned light. First coherent light at a frequency f1 is converted into a pulse light which is output to the optical fiber to be measured. The characteristics of the optical fiber are measured by multiplexing returned light from the optical fiber to be measured and second coherent light at a frequency f2 and by detecting the multiplexed light. A component $|f1-f2|$ is detected from an optical signal obtained by the multiplexed light and is mixed with a signal at a frequency fr to decrease the frequency. An electric signal at a voltage level corresponding to a differential frequency $|f1-f2|-fr$ included in the mixed signal is generated, and a predetermined voltage level is generated which corresponds to a set value for an optical frequency difference between the first and second coherent light. The second light source is driven based on the difference between the two voltage levels to correct the frequency of the second coherent light.

14 Claims, 2 Drawing Sheets

APPARATUS FOR MEASURING CHARACTERISTICS OF OPTICAL FIBER

BACKGROUND OF THE INVENTION

1. Field of the Invention

The present invention relates to an apparatus for measuring various characteristics of an optical fiber. More particularly, the present invention relates to an apparatus for measuring the characteristics of an optical fiber by inputting an optical pulse to the optical fiber, by multiplexing returned light from the optical fiber and locally oscillated light and by performing heterodyne detection.

This application is based on Japanese patent application No. Hei 9-174767 the contents of which are incorporated herein by reference.

2. Description of Related Art

FIG. 2 shows a configuration of an apparatus for measuring the characteristics of an optical fiber according to a related technique. A frequency control circuit 1 controls a driving circuit 2 to stabilize the frequency (frequency f1) of coherent light 3a generated by a light source 3. When an optical pulse generation circuit 4 converts the coherent light 3a into pulse light 4a, the pulse light 4a sequentially passes through an optical directional coupler 5 and an optical connector 6 and reaches to an optical fiber 7 to be measured. Backward scattering light and reflected light such as Rayleigh scattered light and Brillouin scattered light are generated depending on the state of the optical fiber 7 to be measured, and returned light 6a as a part of such light sequentially passes through the optical connector 6 and optical directional coupler 5 to be input to an optical directional coupler 15.

Meanwhile, a frequency control circuit 11 controls a driving circuit 12 to stabilize the frequency (frequency f2) of coherent light 13a generated by a light source 13. The coherent light 13a is locally oscillated light as described above. The optical directional coupler 15 multiplexes the returned light 6a and the coherent light 13a to output an optical signal 15a to an optical detection section 16. The optical detection section 16 performs coherent detection of the optical light 15a to convert it into an electric signal 16a. A signal processing section 17 calculates various characteristics of the optical fiber 7 to be measured based on the electric signal 16a to generate characteristic distribution that depends on positions on the optical fiber 7 to be measured.

In order to detect the returned light 6a properly in the apparatus for measuring the characteristics of optical fiber shown in FIG. 2, a relative frequency difference |f1−f2| between the coherent light 3a and the coherent light 13a must be properly set in accordance with the frequency components of the returned light 6a. For this purpose, according to the related technique, the frequency of each of the light sources 3 and 13 is controlled to determine the relative frequency difference |f1−f2|. However, it is not easy to set the relative frequency difference |f1−f2| accurately by controlling the frequencies of the two light sources independently. As a result, the accuracy of the detection of the returned light 6a is adversely affected by an error included in the relative frequency difference |f1−f2|.

SUMMARY OF THE INVENTION

It is therefore an object of the present invention to provide an apparatus for measuring the characteristics of an optical fiber in which a difference between the frequencies of coherent light generated by two light sources can be accurately and arbitrarily set to allow coherent detection of reflected light and scattered light included in returned light depending on frequency components of the returned light.

According to the present invention, first coherent light generated by a first light source is converted into a pulse light which is input to an optical fiber to be measured. Returned light obtained from the optical fiber to be measured and second coherent light generated by a second light source are multiplexed, and the resultant multiplexed light is detected to measure the characteristics of the optical fiber. In doing so, a difference between optical frequencies of the first coherent light and the second coherent light is measured, and the frequency of the second coherent light is changed in accordance with a deviation between the resultant measured value and a preset value of the optical frequency difference.

This makes it possible to accurately set the difference between the frequencies of the first and second coherent light generated by the first and second light sources, respectively, and to perform preferable coherent detection of reflected light and scattered light included in the returned light in accordance with the frequency components thereof. Even when the frequency of the first coherent light fluctuates, the frequency of the second coherent light is changed in accordance with the deviation between the measured and preset values of the optical frequency difference. Thus, a relative frequency difference between the first and second coherent light is maintained at a desired set value.

DETAILED DESCRIPTION OF PREFERRED EMBODIMENT

Figure 1:
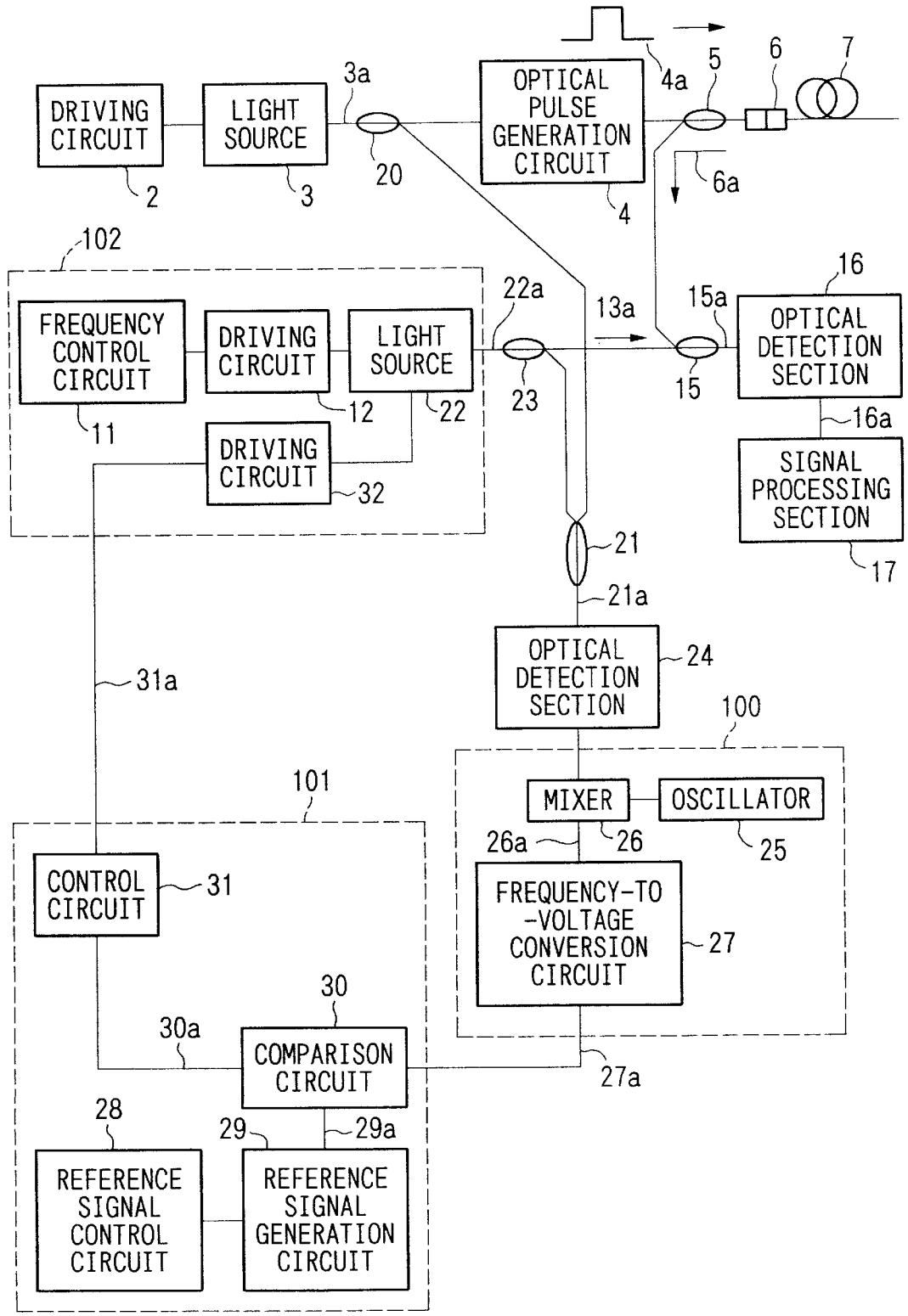
FIG. 1 is a block diagram showing a configuration of an apparatus for measuring the characteristics of an optical fiber according to an embodiment of the present invention.
Figure 2:
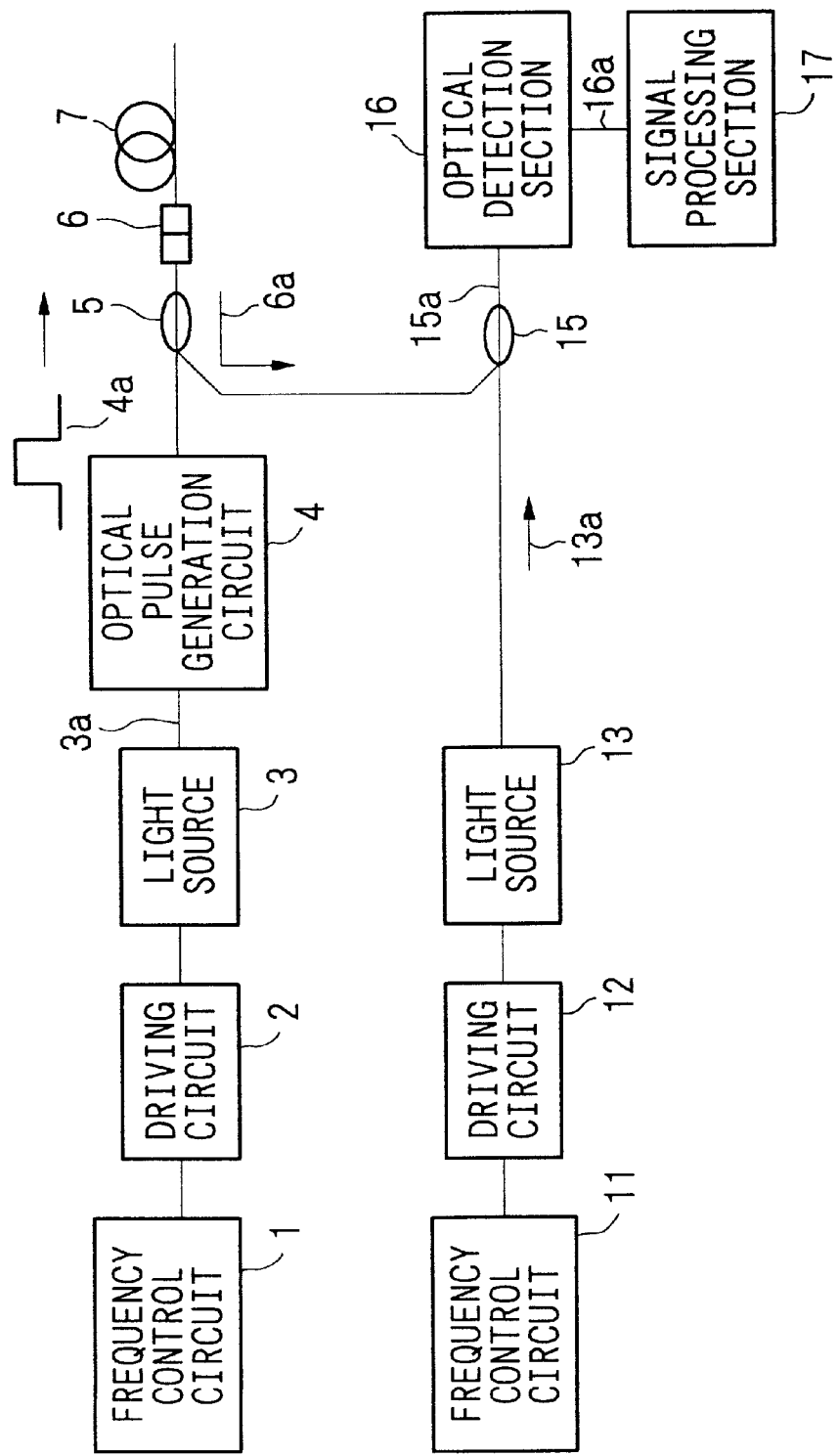
FIG. 2 is a block diagram show showing a configuration of an apparatus for measuring the characteristics of an optical fiber according to the related art.

FIG. 1 is a block diagram showing a configuration of an apparatus for measuring the characteristics of an optical fiber according to an embodiment of the present invention. Elements in FIG. 1 which are the same as those in FIG. 2 are indicated by like reference numbers and will not be described here. An optical directional coupler 20 is provided between the light source 3 and the optical pulse generation circuit 4 to branch the coherent light 3a toward the optical pulse generation circuit 4 and an optical directional coupler 21. A light source 22 has a function equivalent to that of the light source 13 (FIG. 2) and is different from the light source 13 only in that it is driven by the driving circuit 12 and a driving circuit 32 (to be described later). The optical directional coupler 23 is provided between the light source 22 and the optical directional coupler 15 to branch coherent light 22a toward the optical directional coupler 15 and the optical directional coupler 21. The optical directional coupler 21 multiplexes coherent light (at a frequency f1) from the optical directional coupler 20 and coherent light (at a frequency f2) from the optical directional coupler 23 to output an optical signal 21a to an optical detection section 24. The optical signal 21a includes four frequency components f1, f2, |f1−f2| and (f1+f2). The optical detection section 24 detects only the frequency component |f1−f2| from the optical signal 21a and outputs it to a frequency detection section 100.

The frequency detection section 100 comprises an oscillator 25, a mixer 26 and a frequency-to-voltage conversion circuit 27. The oscillator 25 generates an electric signal having a predetermined frequency fr and outputs it to the mixer 26. The mixer 26 mixes the electric signal detected by the optical detection section 24 and the electric signal generated by the oscillator 25 to decrease the frequency of the electric signal detected by the optical detection section 24 to output an electric signal 26a having a differential frequency f3 (=|f1−f2|−fr) to the frequency-to-voltage conversion circuit 27. When the difference between the frequencies f1 and f2 is too large, the accuracy of the detection of the electric signal having the frequency |f1−f2| is reduced, which makes it difficult to detect this electric signal. This is solved by decreasing the frequency of the electric signal output by the optical detection section 24 to a lower frequency band to improve the detection accuracy of the frequency |f1−f2|. The oscillator 25 is configured to allow the frequency fr to be adjusted to the frequency band of the returned light 6a to be detected. The frequency-to-voltage conversion circuit 27 converts the electric signal 26a into an electric signal 27a having a voltage level corresponding to the differential frequency f3 and outputs the electric signal 27a to a control section 101. That is, the voltage level of the electric signal 27a is a signal including the information on the difference between the frequencies of the coherent light 3a and 22a.

The control section 101 comprises a reference signal control circuit 28, a reference signal generation circuit 29, a comparison circuit 30 and a control circuit 31. The reference signal control circuit 28 controls the reference signal generation circuit 29 to output an electric signal 29a to the comparison circuit 30. The reference signal control circuit 28 determines the voltage level of the electric signal 29a in accordance with an optical frequency difference to be set between the coherent light 3a and 22a. The comparison circuit 30 compares the voltage levels of the electric signals 27a and 29a to output an electric signal 30a which is the difference between those voltage levels. That is, the electric signal 30a includes information representing an error between a frequency to be set for the coherent light 22a and an actual frequency of the coherent light 22a. Based on the electric signal 30a, the control circuit 31 outputs a control signal 31a for correcting this frequency error to a driving section 102.

The driving section 102 comprises the frequency control circuit 11, the driving circuit 12, the light source 22 and the driving circuit 32. The driving circuit 32 changes the frequency f2 of the coherent light 22a generated by the light source 22 in accordance with the control signal 31a.

A description will now be made on the operation of the apparatus for measuring the characteristics of an optical fiber according to the present embodiment.

The light source 3 is driven by the driving circuit 2 to generate coherent light 3a. The optical directional coupler 20 branches the coherent light 3a toward the optical pulse generation circuit 4 which in turn converts the branched light into pulse light 4a. The pulse light 4a sequentially passes through the optical directional coupler 5 and the optical connector 6 and reaches to the optical fiber 7 to be measured. This incident light produces the returned light 6a in the optical fiber 7 to be measured, and the returned light 6a passes through the optical connector 6 to return to the optical directional coupler 5.

Meanwhile, the frequency control circuit 11 controls the driving circuit 12 to cause the light source 22 to generate coherent light 22a having a stabilized frequency. When the optical directional coupler 23 branches the coherent light 22a toward the optical directional coupler 15, the optical directional coupler 15 multiplexes the coherent light 13a and the returned light 6a to output the optical signal 15a to the optical detection section 16. The optical detection section 16 performs coherent detection on the optical signal 15a to convert it into the electric signal 16a. The signal processing section 17 calculates the characteristics of the optical fiber 7 to be measured based on the electric signal 16a and generates characteristic distribution of the optical fiber 7 to be measured. In this way, measurement of optical fiber characteristic is carried out similarly to that described in the section of the related art.

Meanwhile, the optical directional coupler 21 multiplexes the coherent light 3a branched by the optical directional coupler 20 and the coherent light 22a branched by the optical directional coupler 23 to output the optical signal 21a to the optical detection section 24. The optical detection section 24 detects only an optical signal having a frequency component |f1−f2| from the optical signal 21a and outputs it to the frequency detection section 100. The frequency detection section 100 decreases the frequency of the signal having the frequency component |f1−f2| by a frequency fr to output the electric signal 27a corresponding to a measured value of the optical frequency difference between the coherent light 3a and coherent light 22a to the control section 101. Based on the voltage level of the electric signal 27a, the control section 101 obtains a difference between a value to be set as the optical frequency difference between those coherent light and the measured value as described above and outputs the control signal 31a. In response, the driving circuit 32 of the driving section 102 controls the light source 22 to change the frequency of the coherent light 22a in accordance with the control signal 31a. As a result, the error between the frequencies of the coherent light 3a and 22a is corrected, and the optical frequency difference between those coherent light is adjusted to the set value as described above.

Even when the optical frequency difference between the coherent light 3a and 22a is significantly deviated from the set value, the above-described operation is repeated to eventually adjust the optical frequency difference between those coherent light to the set value.

As described above, even when the relative frequency difference |f1−f2| between the coherent light 3a and 22a is not equal to a desired set value, the relative frequency difference between those coherent light can be changed to the set value by providing the driving section 102 with the feedback of the deviation between the measured value and the desired set value.

Further, even if the frequency of the coherent light 3a fluctuates, the frequency of the coherent light 22a is changed in accordance with the difference between the optical frequency difference between the coherent light 3a and 22a and the set value to maintain the relative frequency difference between those coherent light at the set value.

In addition, the amount of the change in the frequency of the coherent light 22a introduced by the driving circuit 32 is quite small compared to the amount of the frequency set by the driving circuit 12. It is therefore possible to use the driving circuit 12 for coarse adjustment of the frequency f2 and to use the driving circuit 32 for fine adjustment of the frequency f2. Therefore, by setting the frequency of the coherent light 22a in the vicinity of the desired set value using the driving circuit 12, the optical frequency difference between the coherent light 3a and 22a can be quickly adjusted to the desired set value.

Furthermore, since the voltage level of the reference signal 29a can be arbitrarily set using the reference signal control circuit 28, the set value for the relative frequency difference between the coherent light 3a and 22a can be accurately and arbitrarily set by changing the voltage level.

What is claimed is:

1. An apparatus for measuring the characteristics of an optical fiber, comprising:
    a first light source for generating first coherent light;
    a second light source for generating second coherent light;
    a measurement circuit for measuring the characteristics of said optical fiber to be measured by inputting pulsed light obtained from said first coherent light to said optical fiber to be measured and by detecting multiplexed light of said second coherent light and light returned from said optical fiber to be measured; and
    a frequency setting circuit which multiplexes first coherent light emitted from the first light source and second coherent light emitted from the second light source, measures a frequency difference between the first coherent light and the second coherent light, and adjusts the second light source based on a deviation between the measured value of the frequency difference and a set value of the frequency difference, wherein the set value is based on a frequency component of the returned light, and wherein the second light source is adjusted so that a measured value of the frequency difference between the first coherent light and the second coherent light is substantially the same as the set value.

2. The apparatus for measuring the characteristics of an optical fiber according to claim 1, wherein said frequency setting circuit comprises:
    a frequency difference calculation circuit for calculating the optical frequency difference between said first coherent light and said second coherent light;
    an error calculation circuit for calculating a differential value between said set value for the optical frequency difference and said calculated optical frequency difference; and
    a frequency adjustment circuit for changing the frequency of said second coherent light from a preset value in accordance with said differential value.

3. The apparatus for measuring the characteristics of an optical fiber according to claim 2, wherein said frequency adjustment circuit comprises:
    a coarse adjustment circuit for setting the frequency of said second coherent light at said preset value; and
    a fine adjustment circuit for adjusting the frequency of said second coherent light in accordance with said differential value between said set value for the optical frequency difference and said calculated optical frequency difference.

4. The apparatus for measuring the characteristics of an optical fiber according to claim 2, further comprising a set value control circuit for setting said set value for the optical frequency difference at an arbitrary value.

5. The apparatus for measuring the characteristics of an optical fiber according to claim 4, wherein said frequency difference calculation circuit comprises:
    an optical directional coupler for multiplexing said first coherent light having a frequency f1 and said second coherent light having a frequency f2;
    an extraction circuit for extracting a signal having a component at a frequency |f1−f2| from the multiplexed optical signal; and
    a frequency-to-voltage conversion circuit for generating a signal at a voltage level corresponding to the frequency component of said extracted signal as said optical frequency difference.

6. The apparatus for measuring the characteristics of an optical fiber according to claim 4, wherein said frequency difference calculation circuit outputs an optical frequency difference obtained by subtracting a predetermined frequency value from said optical frequency difference to said error calculation circuit.

7. The apparatus for measuring the characteristics of an optical fiber according to claim 4, wherein said frequency adjustment circuit comprises:
    a coarse adjustment circuit for setting the frequency of said second coherent light at said preset value; and
    a fine adjustment circuit for adjusting the frequency of said second coherent light in accordance with said differential value between said set value for the optical frequency difference and said calculated optical frequency difference.

8. The apparatus for measuring the characteristics of an optical fiber according to claim 2, wherein said frequency difference calculation circuit comprises:
    an optical directional coupler for multiplexing said first coherent light having a frequency f1 and said second coherent light having a frequency f2;
    an extraction circuit for extracting a signal having a component at a frequency |f1−f2| from the multiplexed optical signal; and
    a frequency-to-voltage conversion circuit for generating a signal at a voltage level corresponding to the frequency component of said extracted signal as said optical frequency difference.

9. The apparatus for measuring the characteristics of an optical fiber according to claim 8, wherein said frequency difference calculation circuit further comprises a mixing circuit for mixing said extracted signal with a signal at a predetermined frequency fr and for outputting a signal at a frequency |f1−f2|−fr to said frequency-to-voltage conversion circuit.

10. The apparatus for measuring the characteristics of an optical fiber according to claim 8, wherein said frequency adjustment circuit comprises:
    a coarse adjustment circuit for setting the frequency of said second coherent light at said preset value; and
    a fine adjustment circuit for adjusting the frequency of said second coherent light in accordance with said differential value between said set value for the optical frequency difference and said calculated optical frequency difference.

11. The apparatus for measuring the characteristics of an optical fiber according to claim 2, wherein said frequency difference calculation circuit outputs an optical frequency difference obtained by subtracting a predetermined frequency value from said optical frequency difference to said error calculation circuit.

12. The apparatus for measuring the characteristics of an optical fiber according to claim 11, wherein said frequency adjustment circuit comprises:
    a coarse adjustment circuit for setting the frequency of said second coherent light at said preset value; and
    a fine adjustment circuit for adjusting the frequency of said second coherent light in accordance with said differential value between said set value for the optical frequency difference and said calculated optical frequency difference.

13. An optical frequency control circuit comprising
    an optical directional coupler for multiplexing a first coherent light having a frequency f1 and a second coherent light having a frequency f2;

an extraction circuit for extracting a signal having a component at a frequency |f1−f2| from the multiplexed optical signal;

a mixing circuit for mixing said extracted signal with a signal at a predetermined frequency fr and outputting a signal at a frequency |f1−f2|−fr to said frequency-to-voltage conversion circuit;

a frequency-to-voltage conversion circuit for generating a signal at a voltage level corresponding to the frequency component of the signal output from said mixing circuit as the optical frequency difference between said first coherent light and said second coherent light;

an error calculation circuit for calculating a differential value between a set value for the predetermined optical frequency difference and said optical frequency difference; and a frequency adjustment circuit for changing the frequency of said second coherent light from a preset value and adjusting to said set value the optical frequency difference between said first coherent light and said second coherent light.

14. An optical frequency control circuit comprising:

a frequency difference calculation circuit for multiplexing a first coherent light and a second coherent light, and calculating the optical frequency difference between said first coherent light and said second coherent light;

an error calculation circuit for calculating a differential value between a set value for the predetermined optical frequency difference and said calculated optical frequency difference;

a coarse adjustment circuit for setting the frequency of said second coherent light at a preset value; and a fine adjustment circuit for adjusting the frequency of said second coherent light in accordance with said differential value between said set value for said optical frequency difference and said calculated optical frequency difference, wherein the frequency of said second coherent light is changed from said preset value in accordance with said differential value and the optical frequency difference between said first coherent light and said second coherent light is adjusted to said set value.

* * * * *